Dec. 20, 1938.    J. PALMER    2,140,714
BRICK BOND GAUGE
Filed May 29, 1937
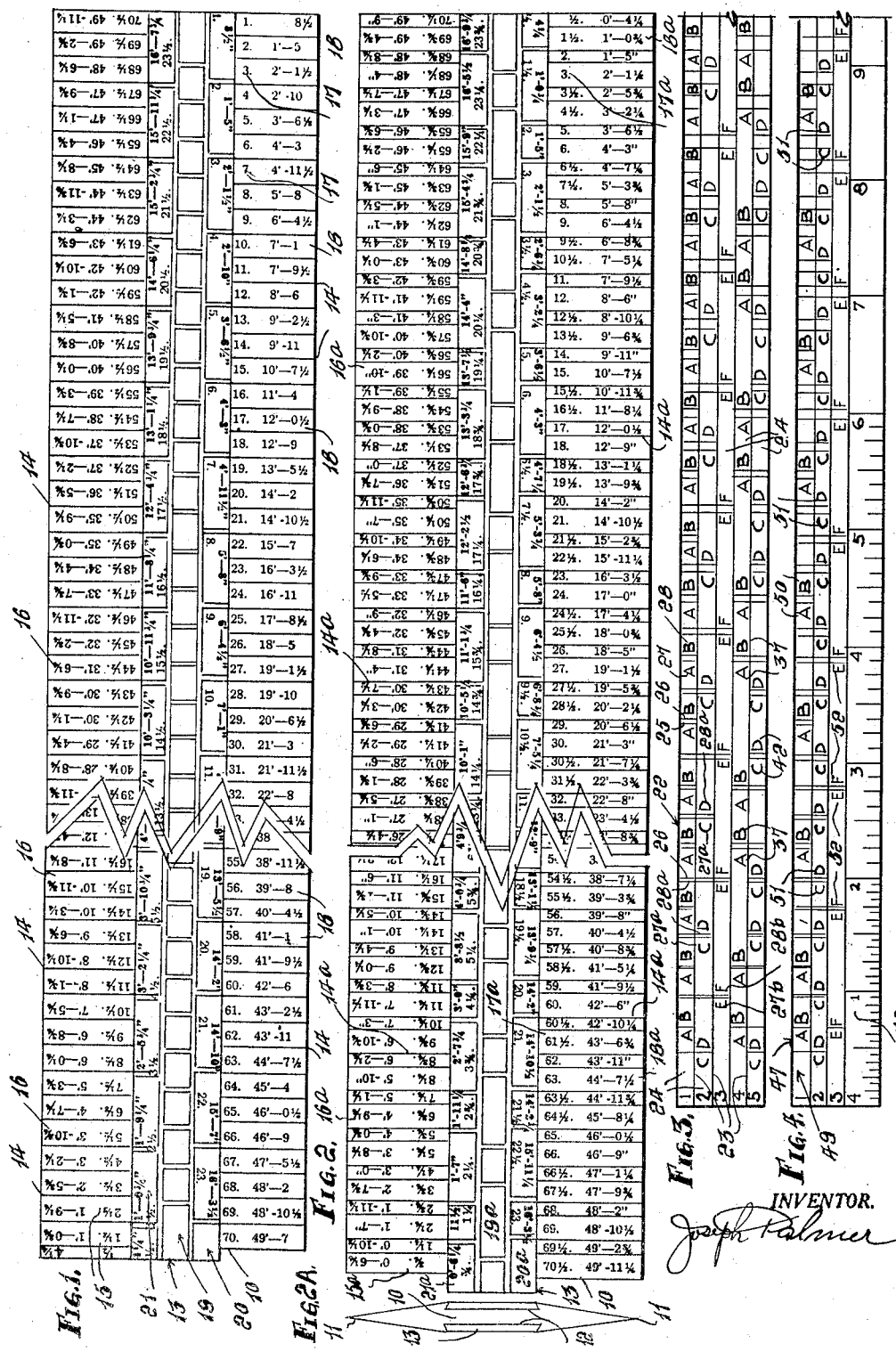
INVENTOR.
Joseph Palmer Patented Dec. 20, 1938

2,140,714

UNITED STATES PATENT OFFICE 2,140,714

BRICK BOND GAUGE

Joseph Palmer, Fort Worth, Tex.

Application May 29, 1937, Serial No. 145,621

2 Claims. (Cl. 33—111)

This invention relates to certain new and useful improvements in brick bond gauges.

The primary object of the invention is to provide a brick bond gauge, ruler or the like especially designed for a horizontal layout and for determining the number of bricks required in a horizontal layout with vertical bonding joints that may range from ⅛ to ⅝ of an inch.

A further object of the invention is to provide a brick bond gauge of the foregoing character for use by an architect or mason for quickly determining and facilitating the designing of brick buildings to establish the correct dimensions for any wall length and eliminating the necessity of calculations.

It is a further object of the invention to provide a brick bond gauge or scale showing complete calculations for American, Flemish, and English or English cross bond for horizontal layouts to enable one to determine at a glance and without calculation the number of bricks required in various courses of given lengths.

A still further object of the invention is to provide a brick bond gauge for horizontal layouts wherein the vertical plumbing of the ends of bricks and parts thereof with the vertical joints results from the horizontal laying out measurements taken from a given vertical line to eliminate the additional labor of vertically plumbing the vertical joints. The mathematical graduations on the gauge may be of American, metric or other system.

With the above and other objects in view that will become apparent as the nature of the invention is better understood, the same consists in the novel form, combination, and arrangement of parts hereinafter more fully described, shown in the accompanying drawing and claimed.

In the drawing:—

Figure 1 is a fragmentary plan view of a gauge or ruler constructed in accordance with the present invention, with graduations thereon of the American or running bond of a brick bond scale with provision for a ½" vertical joint, Figure 2 is a fragmentary plan view of the opposite side of the gauge or ruler shown in Figure 1 with graduations therein representing the Flemish bond with a ½" vertical joint.

Figure 2A is an end elevational view of the gauge shown in Figures 1 and 2,

Figure 3 is a fragmentary plan view of a full size gauge for mason's use dimensioned for ⅜" and ½" vertical joints in horizontal layouts for three different courses in American and common bond and two courses in Flemish bond, and Figure 4 is a fragmentary plan view of a full size gauge with graduations thereon for English and English cross bonds for horizontal layouts.

The gauges illustrated may be formed of any material desired, such as wood, metal, Celluloid, or paper, and while the graduations on the gauges are illustrative of ⅜" and ½" vertical joints for horizontal layouts, it is to be understood that the gauges may be marked to cover bonds or vertical joints between the bricks ranging from ⅛ to ⅝ of an inch and that the graduations may be representative of either the American or metric systems.

As shown in Figures 1, 2 and 2A, the gauge comprises a body 10 of ruler design having tapering side edges 11 with opposite sides of the body 10 intermediate the side edges 11 provided with longitudinally extending dove tailed grooves 12 for the reception of removable gauge rod sections 13 slidably and interlockingly received in said grooves. One side of the gauge body 10 as shown in Figure 1 has graduations thereon illustrative of the American or running brick bond, while the other side of the gauge body 10 has graduations thereon illustrative of a Flemish brick bond. Both the American and Flemish brick bond graduations are scaled for a ½" vertical joint between brick, but it is to be understood that such graduations may disclose vertical joints ranging from ⅛ of an inch to ⅝ of an inch.

In the American or running bond as shown in Figure 1, the tapering side of the gauge body 10 at each side of the groove 12 has transverse lines or graduations 14 thereon preferably spaced ⅛" apart. At the upper side of the gauge as shown in Figure 1 each space between the transverse lines 14 has scale marks or indicia therein, the row of calculations 15 adjacent the groove 12 representing brick and the course to be laid followed and this portion of the gauge starts with one half brick. Assuming that the standard brick 8" in length is to be used in said course, the single length of brick together with a ¼" vertical joint or bond is indicated in the second row of scale marks or indicia 16 adjacent the side edge 11 of the gauge body 10. It will be seen from an inspection of Figure 1 that the course started with one half brick will occupy a length of 4¼" which comprises the length of the half brick of 4" plus a ¼" vertical joint. In the second space it will be seen that one and one-half bricks will occupy 1 foot ¾ inch or 12 and ¾ inches which comprises the lengths of one and one-half bricks equaling 12" and three vertical joints of ¼", amounting to 1 foot ¾ inch.

Reading from the lower and opposite end of the gauge body 10 in Figure 1, it will be seen that a row of scale marks or indicia 17 adjacent the groove 12 in the gauge body 10 starts with a whole brick and in the succeeding spaces between the transverse lines or graduations 14 one brick is successively added. A second line of scale marks or indicia 18 is provided in the spaces between the transverse lines adjacent the edge 11 in the gauge body and said scale marks illustrate the lineal measurements required for the brick or bricks in the corresponding space and includes a ½" vertical joint. As an example, the calculation in the row 17 in the first space shows a whole brick and the length to be occupied thereby including the vertical joint is shown as 8½". In the second space of two bricks the lineal dimension including the vertical joint shows 1 foot 5 inches.

The gauge bar section 13 as shown in Figure 1 is divided into three longitudinally extending parallel zones, each of the zones being pictorial of a brick course, the central zone 19 not entering into the calculation other than to show the bond relation between bricks with the two lateral zones 20 and 21. Zone 20 reading from the left of Figure 1 starts with a full brick and with the vertical joint of ½" shows the measurements thereon of 8½". The second brick in zone 20 shows calculations thereof of 1 foot 5 inches comprising two bricks of 8" each with two ½" vertical joints.

Zone 21 reading from the left-hand end shows the course started with a half brick and reading along said zone to the brick showing fourteen and one-half bricks, the lineal distance to be occupied thereby is shown as 10 feet 3¼ inches. Upon inspecting the scale marks 15 and 16 it will be found that fourteen and one-half bricks will occupy a space of 10 feet 3¼ inches including a ¼" vertical joint.

The opposite side of the gauge rod is shown in Figure 2 and carries graduations or scale marks or indicia illustrative of a Flemish brick bond scale, the tapering sides of the gauge body 10 at each side of the groove 12 being provided with transverse lines or graduations 14ª providing spaces for scale marks or indicia. At the upper side of Figure 2, reading from left to right, there is a row of scale marks or indicia designated by the reference character 15ª indicating the number of brick to occupy a space or length in a course which is designated by the row of scale marks or indicia 16ª in the spaces between the lines 14ª adjacent the tapered edge 11 of the gauge 10. At the lower side of Figure 2 and on the face of the gauge body 10 between the groove 12 and adjacent edge 11, reading from right to left, there is a row of scale marks or indicia 17ª in the spaces between the lines 14ª designating the number of bricks to be laid in a given space or distance in a course with said space or distance defined by the row of scale marks or indicia 18ª in the spaces between the transverse lines adjacent the edge 11 of the gauge body.

The gauge rod 13, carried by the gauge body 10 in the groove 12 thereof at the side of the gauge carrying the Flemish bond scale, has pictorially thereon illustrated a Flemish brick bond 19ª starting with a half brick with whole and half bricks alternating, but said illustration does not enter into the calculations. At one side of the center section or zone 19ª, the zone 20ª starts with a three-quarter brick, the same being followed by a half brick and thereafter followed by alternating whole and half bricks. The longitudinal zone 21ª at the other side of the central zone 19ª, reading from the right-hand end of the gauge starts with a half brick and is thereafter followed alternately by whole and half bricks. The reading of the Flemish bond scale in conjunction with the gauge rod is the same as reading of the American bond scale shown in Figure 1.

A mason's gauge rod 22 is shown in Figure 3 and has five longitudinally extending rows of scale marks or indicia thereon, the upper three rows being indicative of the American and common brick bond and the lower two rows being indicative of a Flemish brick bond. The gauge rod 22 is longitudinally lined as at 23 to provide five longitudinal spaces or zones 24, the upper three zones 24 carrying scale marks or indicia for American brick bond while the lower two zones 24 carry scale marks or indicia for a Flemish brick bond, the gauge rod 22 reading from left to right and having in the first zone 24 scale marks or indicia for the laying of a header course of bricks starting with a three-quarter brick and continuing with half bricks. The upper zone 24 has pairs of brick bond graduations or transverse lines 25 and 26 with symbols 27 and 28 respectively associated with the lines 25 and 26, said symbols being indicated by the letters A and B respectively. The gauge rod 22 is laid directly on the work and markings taken therefrom for the laying of a header course, the distance between the symbols A—A indicating the length of the brick plus a three-eighth inch vertical joint while the distance between the symbols B—B indicates the length of a brick plus a ½" vertical joint.

In the second zone 24 of the gauge rod 22, the brick bond lines 25 and 26 have symbols 27ª and 28ª associated therewith, preferably the letters C and D, the second zone being employed for laying the second course of bricks that starts with a half brick and thereafter continues with whole bricks. The distance between the symbols C—C represents the bricks of the second course, plus the vertical joint of ⅜", while the distance between the symbols D—D represents the length of the bricks in the second course plus the vertical joint of ½". The lines 25 and 26 in the third zone 24 have the symbols 27ᵇ and 28ᵇ associated therewith and indicated by the letters E and F. The third course comprises whole bricks, the distance between the symbols C—C representing a whole brick with a vertical joint of ⅜" while the distance between the symbols D—D represents the whole brick with a vertical joint of ½".

The fourth and fifth zones 24 of the gauge rod 22 carries graduations and scale indicia for a Flemish brick bond, such scale marks or indicia in the fourth zone including pairs of symbols 37 shown as the letters A and B for determining the number of bricks to be laid in a course which starts with a three-quarter brick and thereafter alternates with half and whole bricks respectively. The distance between the symbols A—A represents the length of the brick plus a ⅜" vertical joint, while the distance between the symbols B—B represents the length of a brick plus a ½" vertical joint. In the fifth zone 24 of the gauge rod 22, the symbols 42 indicated by the letters C and D respectively are associated with graduation lines for determining the number of brick in the second course which starts with a half brick and thereafter continuing alternately with whole and half bricks 45 respectively. The distance between the symbols C—C represents the length of a brick plus a ⅜" vertical joint, while the distance between the symbols D—D represents the length of a brick plus a ½" vertical joint.

In the form of gauge rod 47 shown in Figure 4, the graduations and scale marks or indicia thereon are for English and English cross bond, one edge of the gauge rod being lined as at 48 for lineal measurements, such as inches, while the other edge of the gauge rod is provided with three longitudinal zones carrying calculations and symbols for the laying of brick in courses of different dimensions and different vertical joints or bonds. In the first zone 49 the symbols 50 shown as letters A and B appear in conjunction with transverse graduation lines to be read the same as the gauge rod 22 shown in Figure 3, the distance between the lines A—A representing the length of brick plus a ⅜" vertical joint, while the distance between the symbols B—B represents a brick plus a ½" vertical joint. In the second zone the symbols 51 shown as C and D appear and in a like manner represent the length of a brick plus a ⅜" vertical joint, while in the third zone the symbols 52 in the form of letters E and F appear which respectively designate the length of a brick plus a ⅜" or ½" vertical joint. It is to be understood that symbols other than the letters A, B, C, D, E, and F may be employed in conection with the gauge rods 22 and 47, and if desired, such symbols may be the numerals 1, 2, 3, 4, 5, and 6.

From the above detailed description of the invention it is believed that the construction and use thereof will at once be apparent, and while there is herein shown and described the preferred embodiment of the invention, it is nevertheless to be understood that minor changes may be made therein without departing from the spirit and scope of the invention as claimed.

Having thus fully described my invention, I claim:

1. In a brick bond gauge for a horizontal layout, said gauge comprising an elongated gauge body, graduations extending transversely of the gauge body, and scale indicia associated with the graduations and occupying at least two parallel zones extending longitudinally of the gauge for reading successively therealong, said scale indicia and graduations in the several zones representing whole, half and three-quarter bricks combined with a vertical joint of pre-determined width to occupy a known distance in a horizontal course of brick bond, the initial scale indicia and graduations in each zone respectively designating whole, half, and three-quarter bricks for the horizontal bond to be laid whereby the vertical plumbing of the ends of bricks and parts thereof with their vertical joints, results from the horizontal laying out measurement from a given vertical line.

2. In a brick bond gauge for a horizontal layout, said gauge comprising an elongated gauge body, graduations extending transversely of the gauge body, and scale indicia associated with the graduations and occupying at least two parallel zones extending longitudinally of the gauge for reading successively therealong, said scale indicia and graduations in the several zones representing whole, half and three-quarter bricks combined with a vertical joint of pre-determined width to occupy a known distance in a horizontal course of brick bond, the initial scale indicia and graduations in each zone respectively designating whole, half, and three-quarter bricks for the horizontal bond to be laid whereby the vertical plumbing of the ends of bricks and parts thereof with their vertical joints, results from the horizontal laying out measurement from a given vertical line and the scale indicia and graduations comprising at least two sets in each zone determining at least two vertical joints of different widths combined with the number of bricks and sections thereof to occupy a known distance in a horizontal course of brick bond.

JOSEPH PALMER.